US008079280B2

(12) United States Patent
Kubota et al.

(10) Patent No.: US 8,079,280 B2
(45) Date of Patent: Dec. 20, 2011

(54) RACK GUIDE AND RACK-AND-PINION TYPE STEERING APPARATUS USING THE SAME

(75) Inventors: Shuichi Kubota, Kanagawa (JP); Yoshiro Kuzumi, Kanagawa (JP); Hidetoshi Kaida, Kanagawa (JP)

(73) Assignee: Oiles Corporation, Tokyo (JP)

( * ) Notice: Subject to any disclaimer, the term of this patent is extended or adjusted under 35 U.S.C. 154(b) by 289 days.

(21) Appl. No.: 10/592,316

(22) PCT Filed: Mar. 4, 2005

(86) PCT No.: PCT/JP2005/003794

§ 371 (c)(1), (2), (4) Date: Sep. 11, 2006

(87) PCT Pub. No.: WO2005/085039

PCT Pub. Date: Sep. 15, 2005

(65) Prior Publication Data

US 2007/0205572 A1 Sep. 6, 2007

(30) Foreign Application Priority Data

Mar. 9, 2004 (JP) ................................ 2004-066369
Sep. 8, 2004 (JP) ................................ 2004-261540

(51) Int. Cl.
*F16H 1/04* (2006.01)

(52) U.S. Cl. ......................... 74/422; 74/89.11; 74/89.19

(58) Field of Classification Search ............... 74/388 PS, 74/422, 89.12, 89.11, 89.17, 89.18, 498; 180/428, 427; 280/93.574, 93.514
See application file for complete search history.

(56) References Cited

U.S. PATENT DOCUMENTS 4,793,433 A 12/1988 Emori et al.
5,022,279 A * 6/1991 Ueno et al. ...................... 74/422
6,142,031 A * 11/2000 Phillips ........................... 74/422
6,539,821 B2 * 4/2003 Bugosh ........................... 74/422

FOREIGN PATENT DOCUMENTS

DE 3724136 A1 2/1988
DE 198 11 917 A1 9/1998
EP 1 507 694 10/2005
FR 2 859 439 3/2005
JP 2-65674 5/1990

(Continued)

OTHER PUBLICATIONS

Microfilm of the specification and drawings annexed to the request of Japanese Utility Model Application No. 80524/1974 (Laid Open (KOKAI) No. 51/9431).

(Continued)

*Primary Examiner* — Justin Krause
*Assistant Examiner* — Daniel Yabut
(74) *Attorney, Agent, or Firm* — Nixon & Vanderhye P.C.

(57) ABSTRACT

A rack-and-pinion type steering apparatus 1 includes a gear case 3 made of aluminum or an aluminum alloy and having a hollow portion 2; a steering shaft 6 rotatably supported by the gear case 3 through rolling bearings 4 and 5; a pinion 7 which is rotatably supported in the gear case 3 through the steering shaft 6; a rack bar 9 on which rack teeth 8 meshing with the pinion 7 are formed; and a rack guide 10 which is disposed in the hollow portion 2 inside the gear case 3 and supports the rack bar 9 slidably with respect to its moving direction A.

27 Claims, 12 Drawing Sheets

FOREIGN PATENT DOCUMENTS

| | | | |
|---|---|---|---|
| JP | 08067259 | | 3/1996 |
| WO | WO 03/097427 | A1 | 11/2003 |

OTHER PUBLICATIONS

Microfilm of the specification and drawings annexed to the request of Japanese Utility Model Application No. 17522/1984 (Laid Open (KOKAI) No. 60-130175).

International Search Report of PCT/JP2005/003794, mailed Apr. 19, 2005.

Microfilm of the specification and drawings annexed to the request of Japanese Utility Model Application No. 046966/1981(Laid-open No. 159056/1982)(Taiho Kogyo Co., Ltd.), Oct. 6, 1982, pp. 13 to 15; Figs. 9 to 11 (Family: none).

JP 8-67259 A (Koyo Seiko Co., Ltd.), Mar. 12, 1996, Par. No. {0022}; Fig. 2 (Family: none).

Microfilm of the specification and drawings annexed to the request of Japanese Utility Model Application No. 145811/1988(Laid-open No. 65674/1990) pp. 6 to 8; Figs. 1 to 3 (Family: none).

Microfilm of the specification and drawings annexed to the request of Japanese Utility Model Application No. 115222/1981(Laid-open No. 19874/1983)(Toyoda Machine Works, Ltd.), Feb. 7, 1983, Figs. 3, 4 to 5 (Family: none).

Microfilm of the specification and drawings annexed to the request of Japanese Utility Model Application No. 70951/1988)(Koyo Seiko Co., Ltd.), Dec. 8, 1989, Figs. 1 to 3 (Family:none).

* cited by examiner

[Fig. 1]
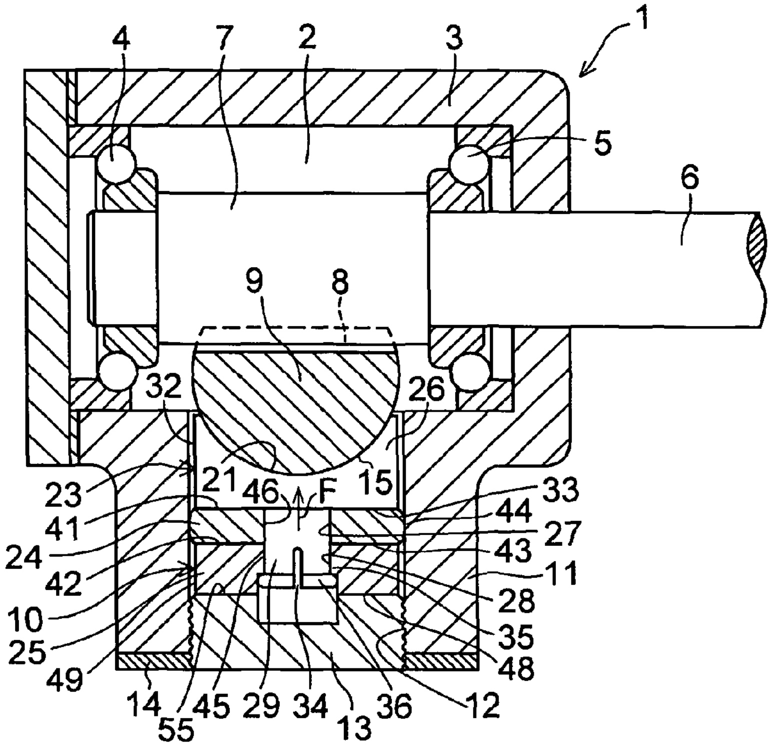
[Fig. 2]
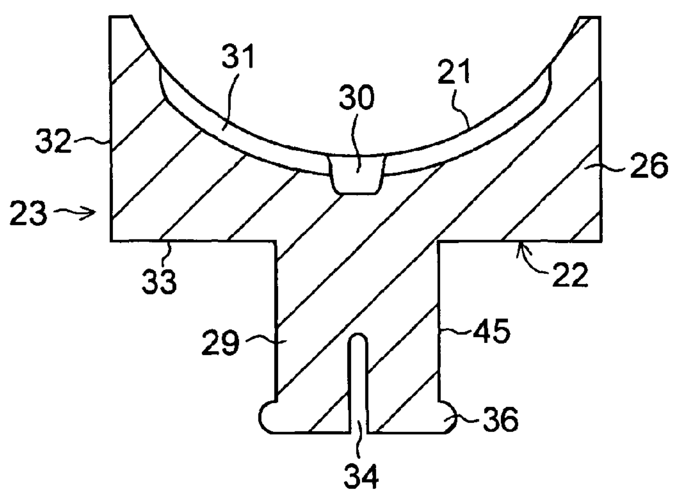

[Fig. 3]
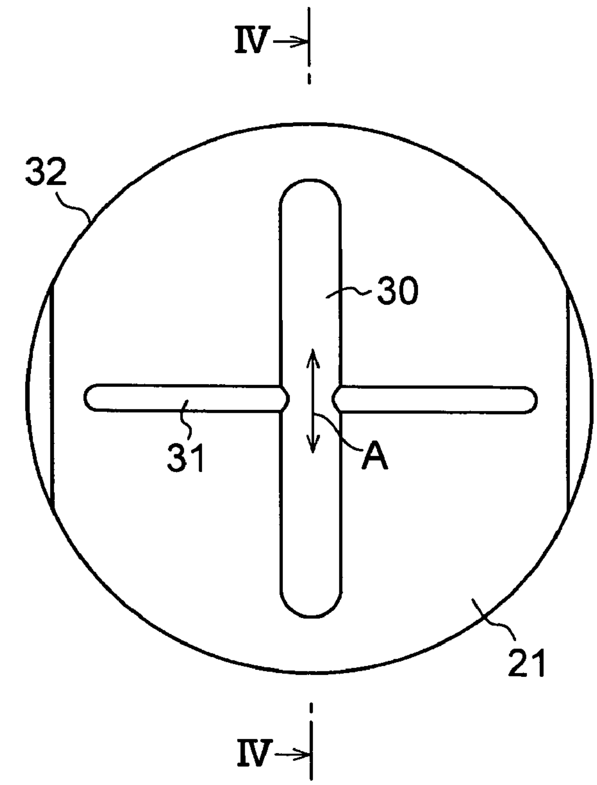
[Fig. 4]
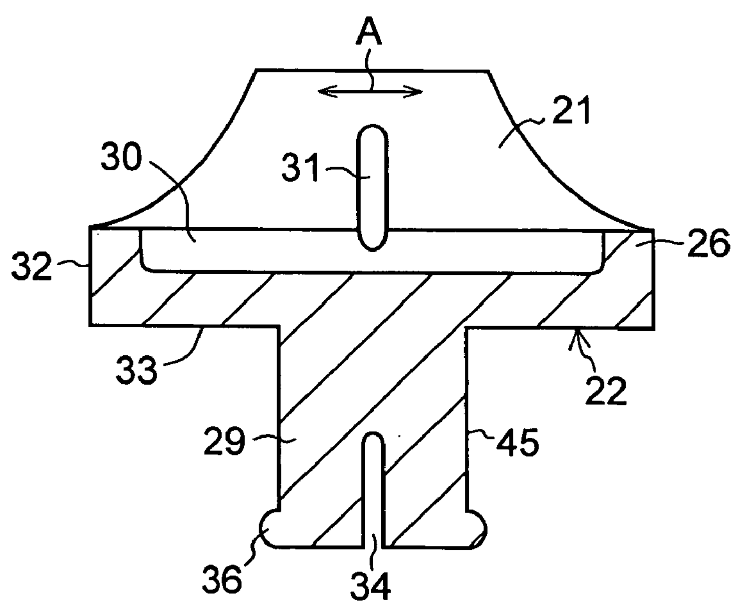

[ Fig. 5 ]
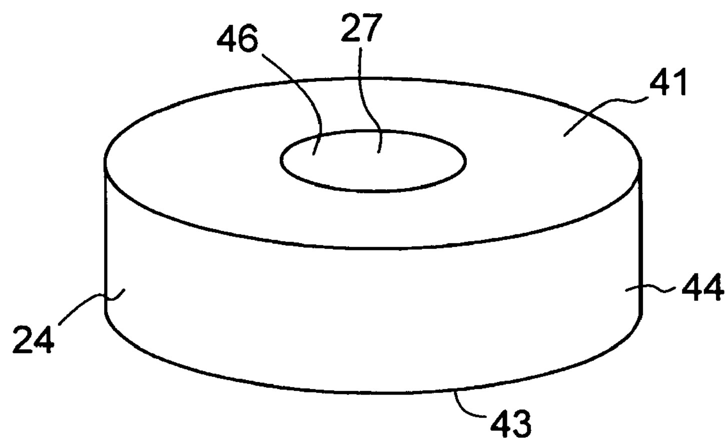
[ Fig. 6 ]
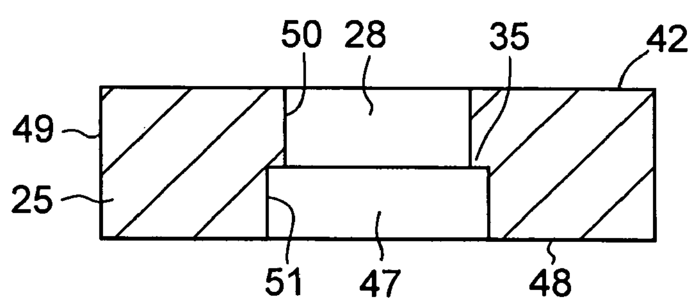

[ Fig. 7 ]
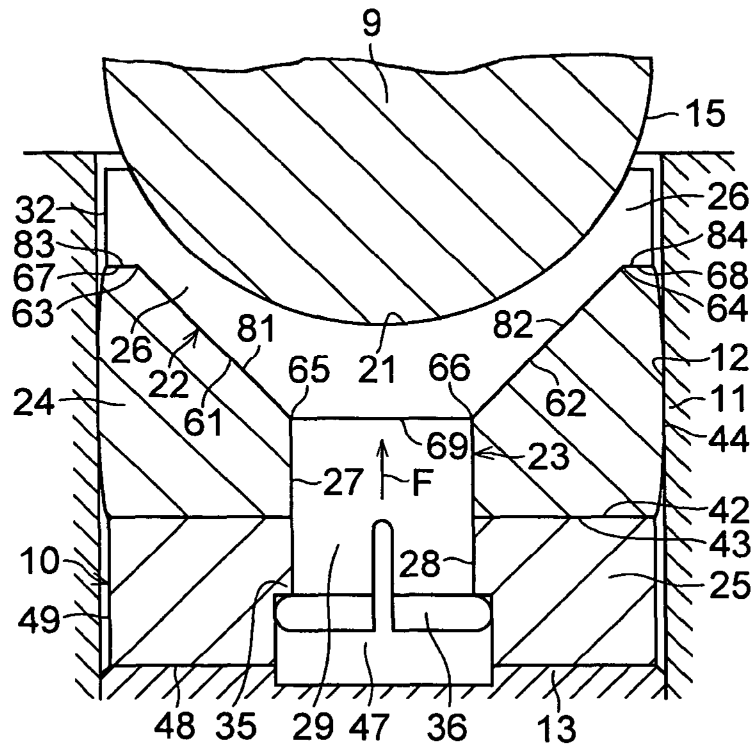
[ Fig. 8 ]
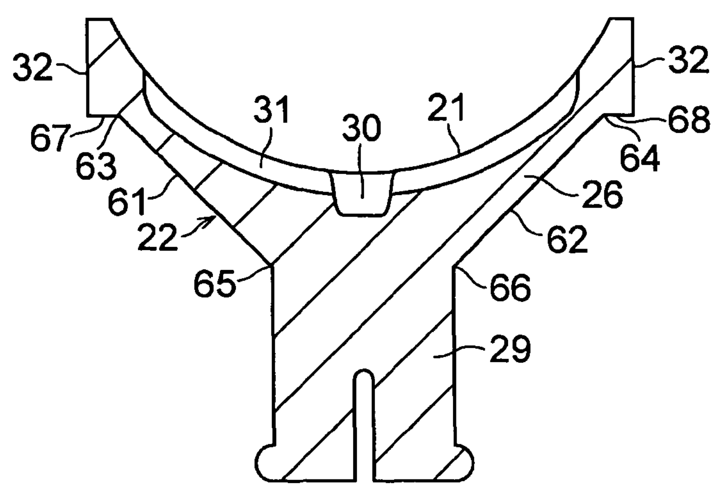

[ Fig. 9 ]
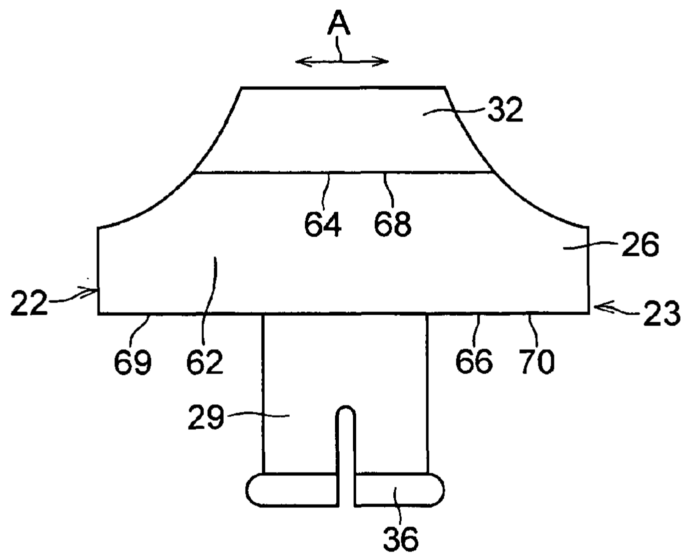
[ Fig.10 ]
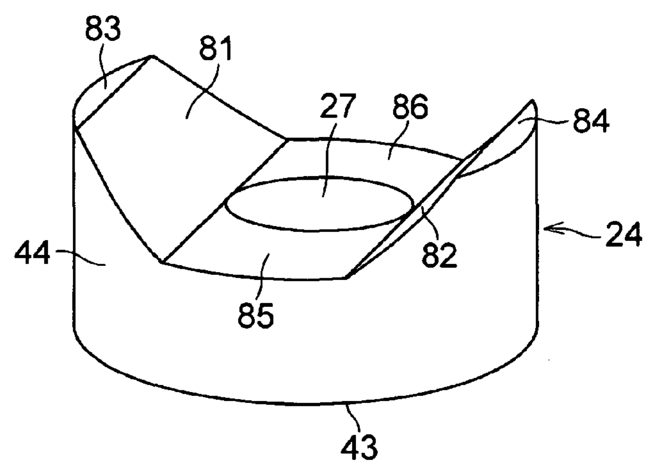
[ Fig.11 ]
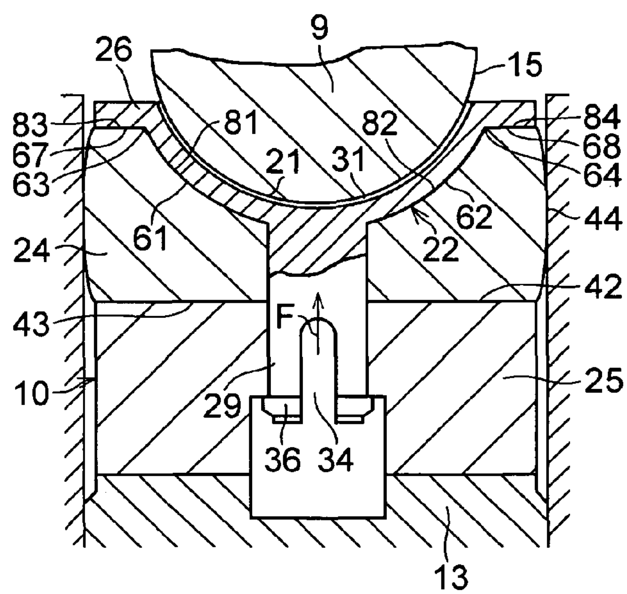

[ Fig.12 ]
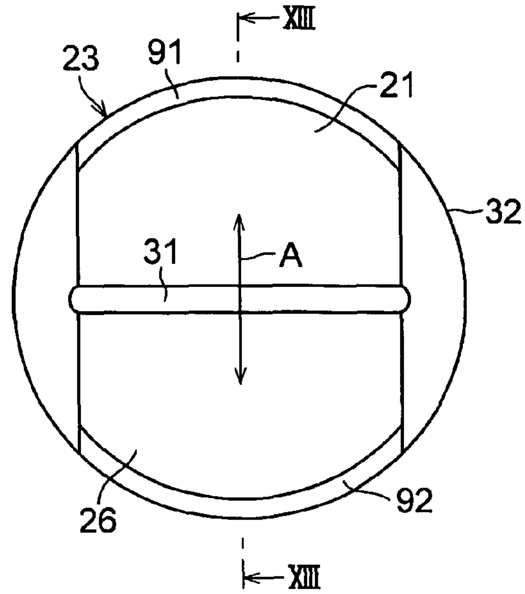
[ Fig.13 ]
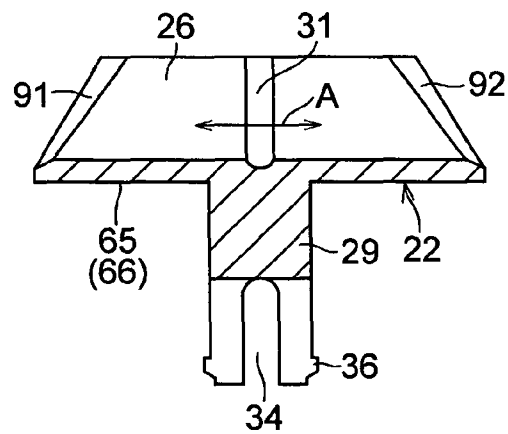
[ Fig.14 ]
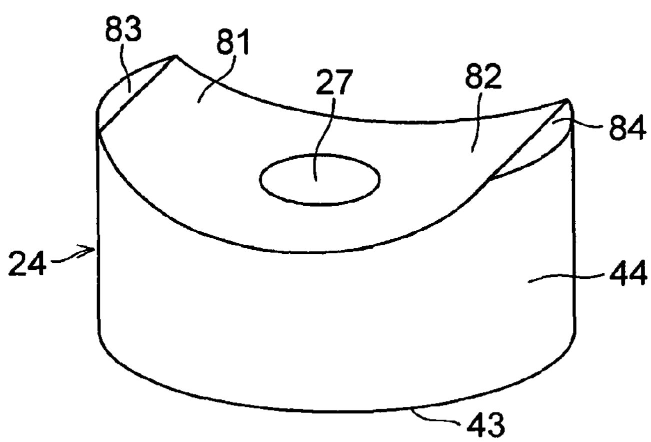

[ Fig.15 ]
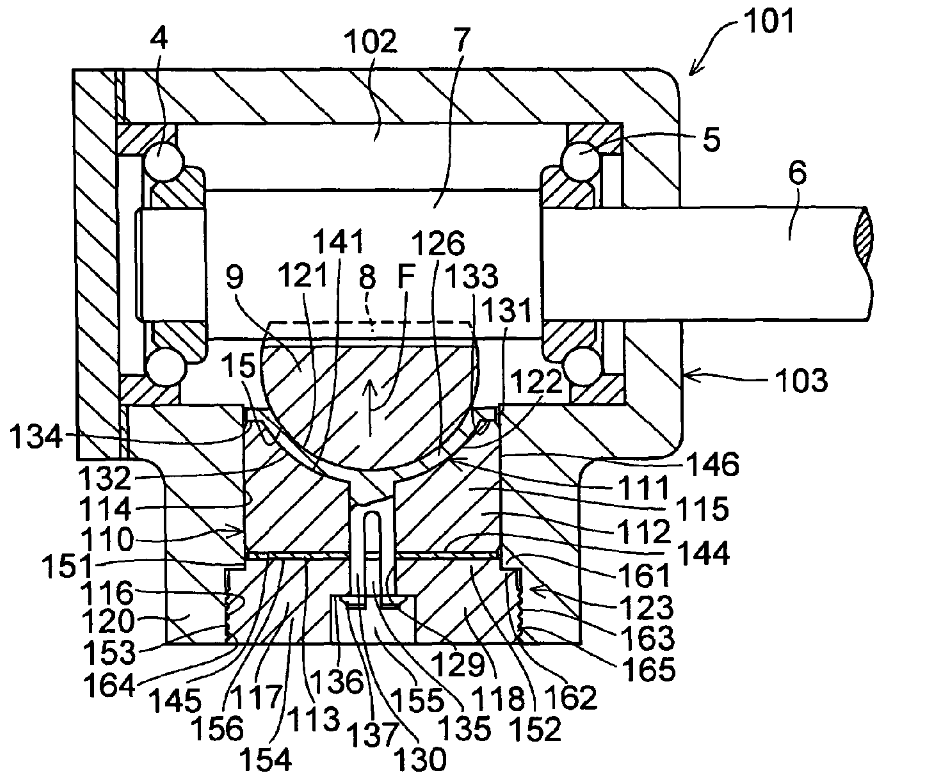
[ Fig.16 ]
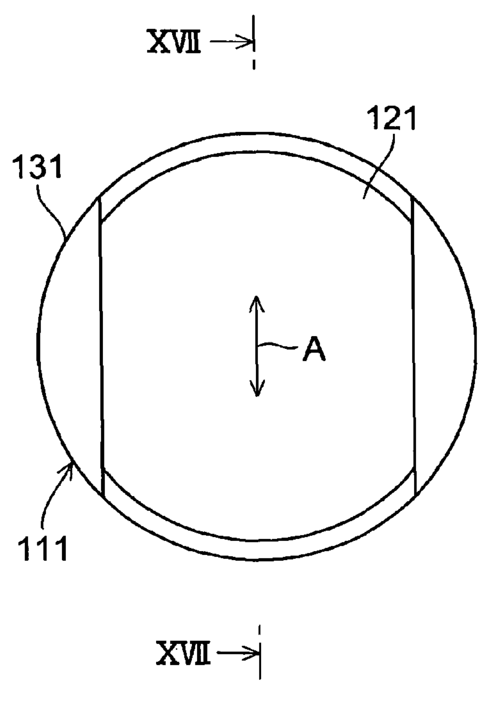

[ Fig.17 ]
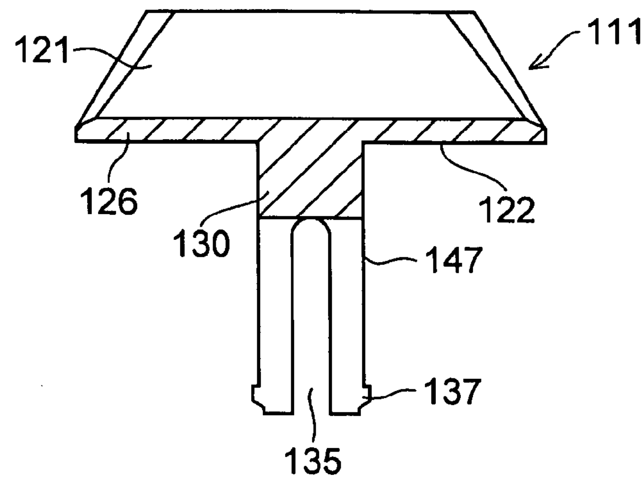
[ Fig.18 ]
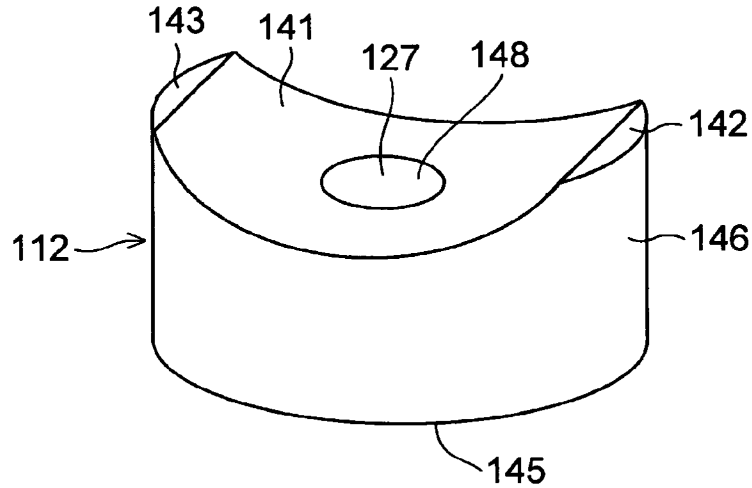
[ Fig.19 ]
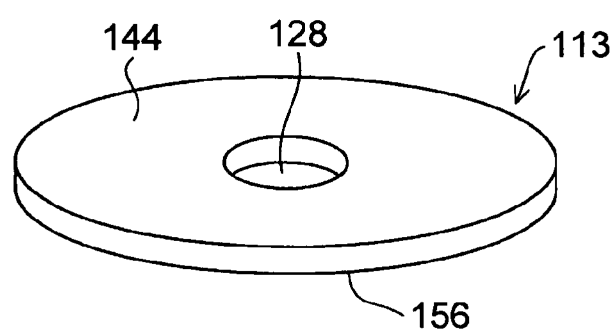

[ Fig. 20 ]
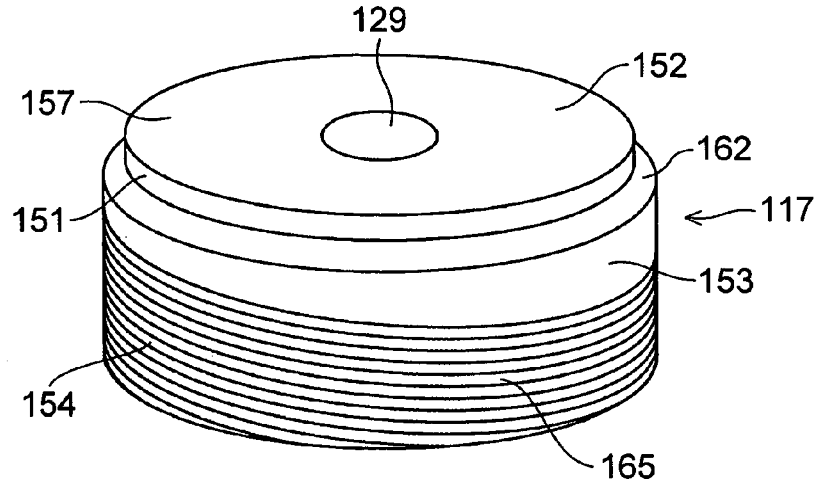
[ Fig. 21 ]
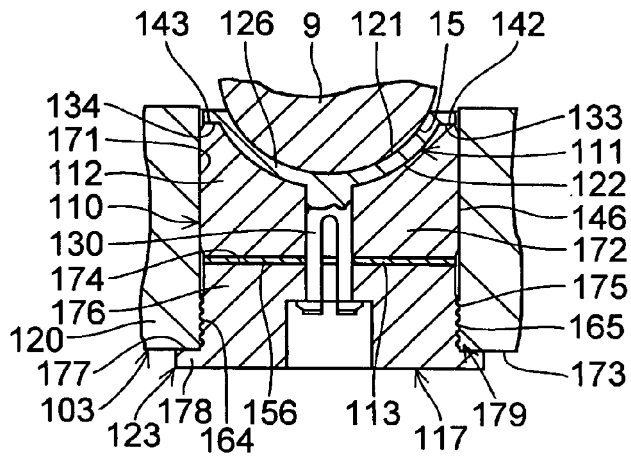
[ Fig. 22 ]
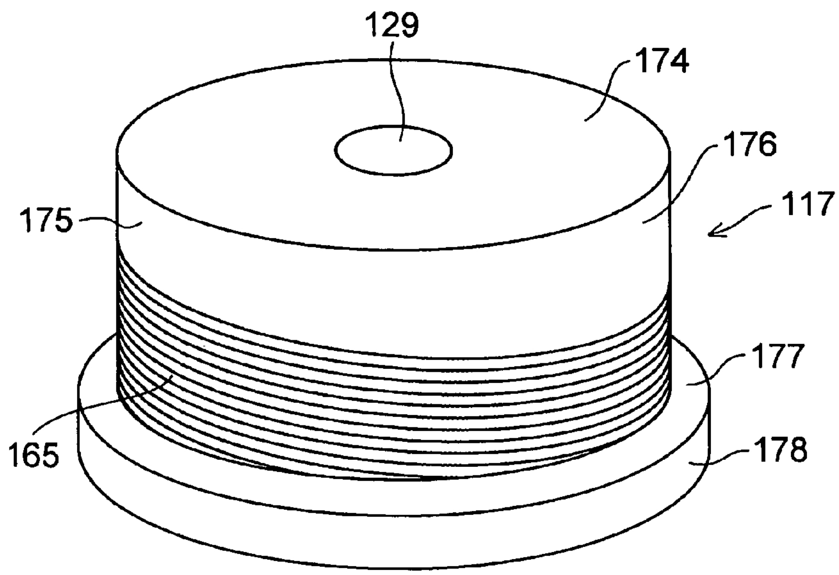

[ Fig. 23 ]
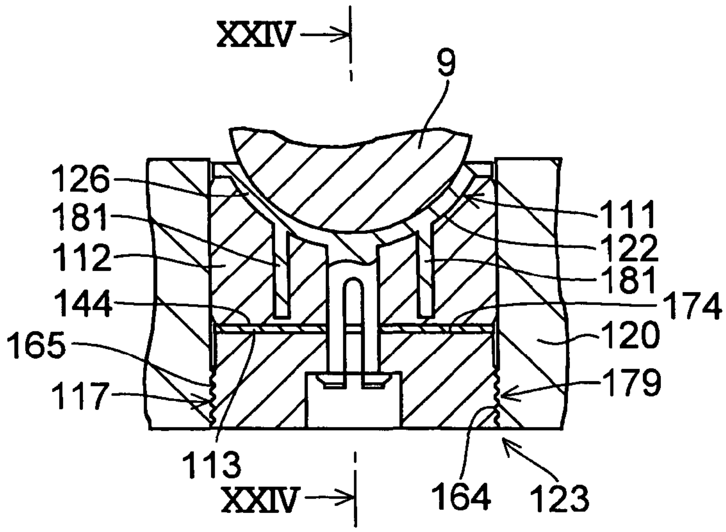
[ Fig. 24 ]
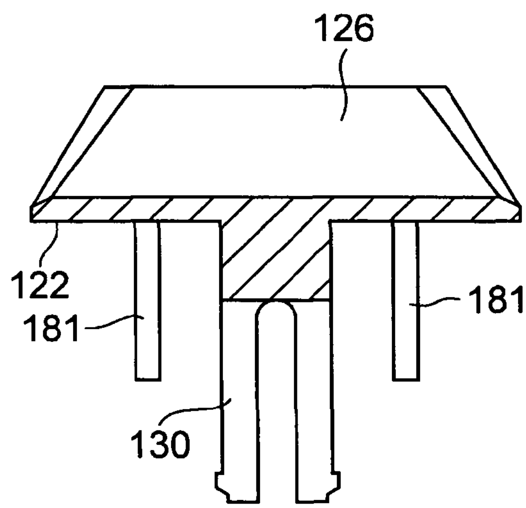
[ Fig. 25 ]
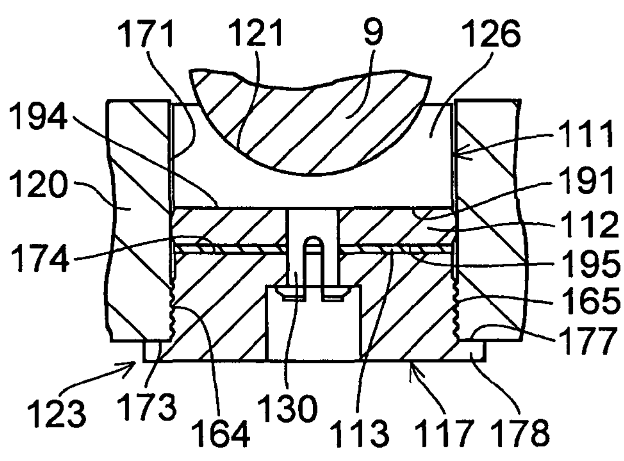

[ Fig. 26 ]
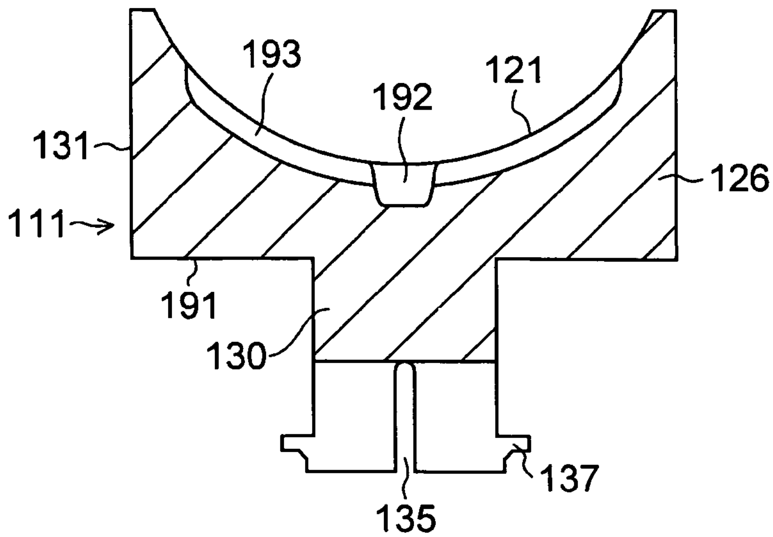
[ Fig. 27 ]
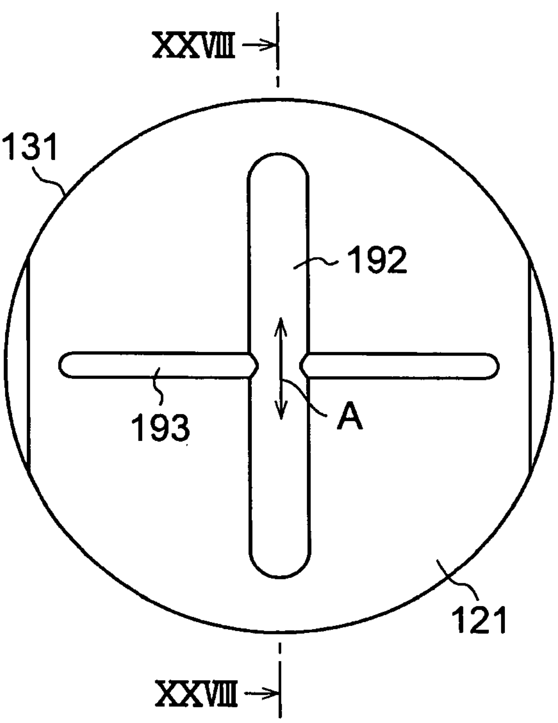

[ Fig. 28 ]
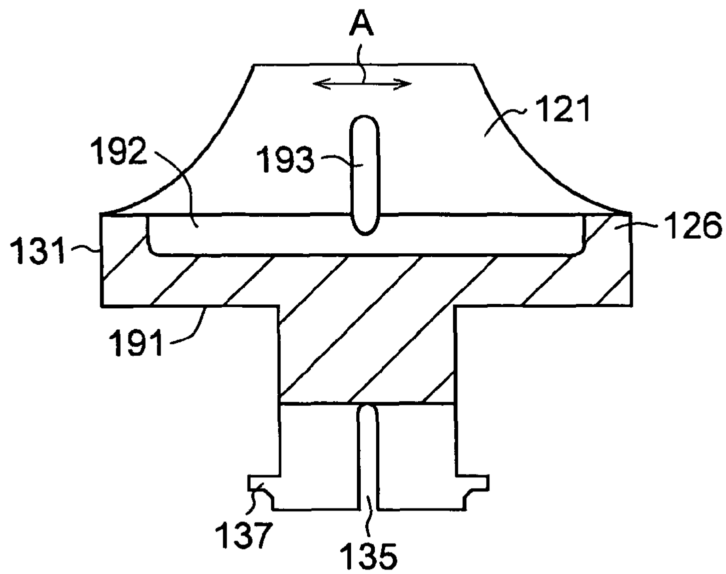
[ Fig. 29 ]
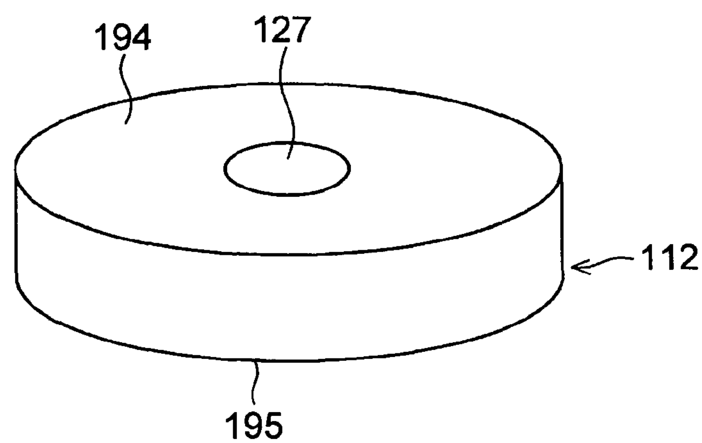

RACK GUIDE AND RACK-AND-PINION TYPE STEERING APPARATUS USING THE SAME

This application is the US national phase of International application PCT/JP2005/003794, filed 4 Mar. 2005, which designated the U.S. and claims priority of JP2004-066369, filed 9 Mar. 2004, and JP2004-261540, filed 8 Sep. 2004, the entire contents of each of which are hereby incorporated by reference.

TECHNICAL FIELD

The present invention relates to a rack guide for use in a vehicle such as an automobile for effecting steering by rotating a pinion in interlocking relation to the rotating operation of a steering wheel and by reciprocating a rack bar having rack teeth meshing with the pinion, as well as a rack-and-pinion type steering apparatus having the rack guide.

BACKGROUND ART

Patent document 1: JP-A-58-19873

A rack-and-pinion type steering apparatus is generally comprised of a gear case, a pinion rotatably supported by this gear case through a pinion shaft, a rack bar on which rack teeth meshing with this pinion are formed, a rack guide disposed in the gear case to slidably support the rack bar, and a coil spring for pressing this rack guide toward the rack bar.

In such a rack-and-pinion type steering apparatus, in meshing portions of the pinion and the rack teeth of the rack bar, forces oriented in mutually opposite directions act in conjunction with the rotation of the pinion shaft, so that deflection occurs in the rack bar, and backlash in the direction of the row of rack teeth becomes large. As a result, knocking sounds are generated between the tooth portions of the rack teeth and the pinion. Therefore, there is provided a rack guide having a concave surface, generally a semicylindrical concave surface, which has a small frictional resistance at a side opposing the pinion shaft with respect to the rack bar. The concave surface of this rack guide is pressed against the rack bar by the resiliently pressing force of the coil spring. The arrangement provided is such that while the sliding frictional resistance with the rack bar is being reduced by bringing the concave surface of the rack guide into sliding contact with the rack bar, the backlash in the direction of the row of rack teeth is suppressed, to thereby reduce the knocking sounds at the meshing portions of the rack teeth and the pinion.

DISCLOSURE OF THE INVENTION

Problems to be Solved by the Invention

As the rack guides, those which are formed by using a sintered metal or aluminum or an aluminum alloy have been proposed, among others. In any one of these rack guides, a clearance of about 20 μm or thereabouts is provided between the rack guide and an inner surface of the gear case because of the need to secure the moving function of the rack guide in the gear case. However, even in the case where such a clearance is provided, if a radial load is applied to the rack guide due to the torsion of the teeth occurring in the meshing between the pinion and the rack teeth and due to the action at both ends of the rack bar from the wheels, the rack guide is possibly pressed strongly against the inner surface of the gear case. In this state, coupled with the action of the pressing force due to the coil spring, the two members of the rack guide and the gear case are in the state of the so-called "metals of similar composition," so that the frictional resistance increases, and adhesive wear is hence brought about. Thus there arises the problem that the movement of the rack guide in the direction toward the rack bar is hampered.

To overcome the above-described problem, a rack guide to which a buffer member such as an O-ring is attached has been proposed. However, if the buffer member such as the O-ring is attached, the load of the coil spring becomes large owing to the sliding resistance in the sliding motion between the buffer member and the inner surface of the gear case, and permanent set (deterioration) is likely to occur to the coil spring. If the resiliently pressing force of the coil spring becomes insufficient owing to this permanent set, the bouncing of the rack guide occurs, and the rack guide collides against the gear case. This also induces abnormal noise (knocking sounds).

In addition, if the resiliently pressing force against the concave surface of the rack guide is large, it is possible to reduce knocking sounds at the meshing portions of the rack teeth and the pinion. However, a large force is required in the rotating operation of the steering wheel, and the steerability becomes aggravated. On the other hand, if the resiliently pressing force against the concave surface of the rack guide is small, the steerability improves, but it is difficult to obtain reduction of the knocking sounds, so that troublesome operation is required in the optimal setting of the resiliently pressing force.

The present invention has been devised in view of the above-described circumstances, and its object is to provide a rack guide which, as a result of disusing the coil spring, makes it possible to eliminate the occurrence of abnormal noise ascribable to the permanent set of the coil spring, as well as a rack-and-pinion type steering apparatus using the same.

Another object of the present invention is to provide a rack-and-pinion type steering apparatus which makes it possible to easily set an optimal resiliently pressing force at all times.

Means for Solving the Problems

In accordance with the present invention, there is provided a rack guide for a rack-and-pinion type steering apparatus, comprising: a rack guide body having a concave surface which slidably comes into contact with a rack bar and having a pressure receiving surface for receiving a pressing force directed toward the rack bar; a resiliently deformable member disposed on a side of a pressure receiving surface of the rack guide body; and a pressing member for imparting to the resiliently deformable member a pressing force directed toward the rack bar, wherein the resiliently deformable member is disposed between the rack guide body and the pressing member so as to bulge in a direction perpendicular to the direction of the pressing force by being resiliently deformed by the pressing force directed from the pressing member toward the rack bar.

According to the rack guide in accordance with the present invention, the resiliently deformable member is provided which is disposed between the rack guide body and the pressing member so as to bulge in a direction perpendicular to the direction of the pressing force by being resiliently deformed by the pressing force directed from the pressing member toward the rack bar. Therefore, the resiliently deformable member exhibits a function similar to that of a buffer member such as the O-ring. Further, the resiliently deformable member is capable of changing the amount of its bulge or hardness in correspondence with the magnitude of the reaction force with respect to the pressing force. Moreover, the resiliently pressing force directed toward the rack bar can be produced by the resiliently deformable member instead of the coil spring. As a result, it is possible to reliably avoid the direct contact of the rack guide body with the inner surface of the gear case, and it is possible to disuse the coil spring and eliminate the occurrence of abnormal noise ascribable to the permanent set of the coil spring.

In a preferred example, the pressure receiving surface has a perpendicular pressure receiving surface perpendicular to the direction of the pressing force, and the resiliently deformable member includes a perpendicular pressing surface opposing the perpendicular pressure receiving surface and having a shape corresponding to the perpendicular pressure receiving surface, and is disposed between the perpendicular pressure receiving surface of the rack guide body and the pressing member. In this case, the perpendicular pressure receiving surface and the perpendicular pressing surface are preferably in contact with each other.

In another preferred example, the pressure receiving surface includes a pair of inclined pressure receiving surfaces which are inclined with respect to the direction of the pressing force in such a manner as to be gradually spaced apart from each other in the direction of the pressing force, as well as a pair of perpendicular pressure receiving surfaces which are respectively contiguous to end edges of the pair of inclined pressure receiving surfaces in the direction of the pressing force and are perpendicular to the direction of the pressing force. Further, the resiliently deformable member includes a pair of inclined pressing surfaces opposing the pair of inclined pressure receiving surfaces and having shapes corresponding to the pair of inclined pressure receiving surfaces, as well as a pair of perpendicular pressing surfaces opposing the pair of perpendicular pressure receiving surfaces and having shapes corresponding to the perpendicular pressure receiving surfaces, and is disposed between, on the one hand, the pressing member and, on the other hand, the inclined pressure receiving surfaces and the perpendicular pressure receiving surfaces with respect to the direction of the pressing force. In this case, each of the end edges of the pair of inclined pressure receiving surfaces in the direction of the pressing force may be parallel to a moving direction of the rack bar, and each of the inclined pressure receiving surfaces and the inclined pressing surfaces may be a straight flat surface or a curved surface. The inclined pressure receiving surface and the inclined pressing surface may be in contact with each other, and the perpendicular pressure receiving surface and the perpendicular pressing surface may be in contact with each other.

In the present invention, the pair of inclined pressure receiving surfaces may be contiguous with each other, and the pair of inclined pressing surfaces may be contiguous with each other. The pair of inclined pressure receiving surfaces may respectively have other end edges which are located in the direction opposing the direction of the pressing force and which are parallel to the moving direction of the rack bar, an interval between the other end edges being narrower than a mutual interval between the pair of end edges in the direction of the pressing force. Further, the pressure receiving surface may have another perpendicular pressure receiving surface which is contiguous to each of the other end edges and is perpendicular to the direction of the pressing force. Furthermore, the resiliently deformable member may include another perpendicular pressing surface opposing the other perpendicular pressure receiving surface and having a shape corresponding to the other perpendicular pressure receiving surface, and may be disposed between the other perpendicular pressure receiving surface and the pressing member with respect to the direction of the pressing force. In this case, the other perpendicular pressure receiving surface and the other perpendicular pressing surface may be in contact with each other.

In the rack guide in these examples, since the rack guide body receives the pressing force directed toward the rack bar through the inclined pressure receiving surfaces, in the case where the rack guide body has slight resilient deformability, the rack bar is supported from both diagonal sides through the rack guide body. In consequence, the rack bar is slidably supported more stably.

In the rack guide in accordance with the present invention, the pressing member may have a perpendicular pressing surface perpendicular to the direction of the pressing force, and the resiliently deformable member may have a perpendicular pressure receiving surface opposing the perpendicular pressing surface of the pressing member and having a shape corresponding to the perpendicular pressing surface of the pressing member, and may be disposed between the rack guide body and the perpendicular pressing surface of the pressing member with respect to the direction of the pressing force. In this case, the perpendicular pressure receiving surface of the resiliently deformable member and the perpendicular pressing surface of the pressing member may be in contact with each other.

In still another preferred example of the present invention, the rack guide body may have a perpendicular elongated groove disposed in the concave surface and extending perpendicularly to the moving direction of the rack bar and/or an elongated bottom groove disposed in a bottom of the concave surface and extending parallel to the moving direction of the rack bar. Further, the rack guide body may have a perpendicular elongated groove disposed in the concave surface and extending perpendicularly to the moving direction of the rack bar and an elongated bottom groove disposed in a bottom of the concave surface and extending parallel to the moving direction of the rack bar, in this case, the elongated bottom groove is wider and deeper than the perpendicular elongated groove.

As the rack guide has at least one of such an elongated bottom groove and a perpendicular elongated groove, a lubricating oil such as grease can be accumulated therein. Hence, the lubricating oil can be supplied to between the rack bar and the concave surface, so that the rack bar can be slidably supported with a low frictional resistance. Moreover, in the case where the rack guide body has the inclined pressure receiving surfaces, the concave surface becomes easily deformable due to the elongated bottom groove. As a result, the support of the rack bar from both diagonal sides by the concave surface can be effected more effectively, so that the rack bar can be movably supported more stably.

Each of the resiliently deformable member and the pressing member preferably has a through hole. In this case, the rack guide body may include a main body portion having the concave surface and the pressure receiving surface, and a supporting portion which at its one end is provided integrally on the main body portion and is passed through each of the through holes of the resiliently deformable member and the pressing member. Further, the rack guide body may have at another end of the supporting portion a slit for facilitating the insertion of the supporting portion into the through holes, as well as a bulged portion for preventing the supporting portion from coming off the through hole of the pressing member.

According to the rack guide in accordance with the above-described examples, the rack guide body, the resiliently deformable member, and the pressing member can be integrated, the fitting of these members into the hollow portion of the gear case can be performed easily, and the rack guide body and the pressing member can be firmly fixed to the resiliently deformable member.

The rack guide body or the pressing member may be formed of a metal or a synthetic resin. As metal materials for forming the rack guide body, it is possible to cite a sintered metal or aluminum or an aluminum alloy as preferred examples. As a preferred example of a synthetic resin material for forming the rack guide body, it is possible to cite polyacetal. Further, as a metal material for forming the pressing member, it is possible to cite a sintered metal or aluminum or an aluminum alloy, and cite polyacetal as a synthetic resin material.

The resiliently deformable member may have various shapes of outer peripheral surfaces insofar as it is capable of avoiding a direct collision of the rack guide body against the inner surface of the gear case by abutting against the inner surface of the gear case in its bulging due to its resilient deformation. Preferably, however, the resiliently deformable member has a cylindrical outer surface.

Preferably, the resiliently deformable member is formed of natural or synthetic rubber or a resin such as a polyurethane elastomer. However, the present invention is not limited to the same, and the resiliently deformable member may be formed of another natural or synthetic resin exhibiting resilient deformability such as urethane rubber.

In the rack guide in accordance with the invention, another member, such as a spacer member, may be interposed in at least one of the gap between the rack guide body and the resiliently deformable member and the gap between the resiliently deformable member and the pressing member. Further, the resiliently deformable member may be constructed by a plurality of resiliently deformable plates, e.g., one in which rubber plates are laminated. Furthermore, the inclined pressure receiving surface is not limited to a straight flat surface (flat surface) or a curved surface such as a semicylindrical or spherical surface, and may be a polygonal surface.

In accordance with the present invention, there is provided a rack-and-pinion type steering apparatus comprising: a gear case; a pinion which is rotatably supported in the gear case; a rack bar on which teeth meshing with the pinion are formed; and the rack guide according to any one of the above-described aspects for slidably supporting the rack bar, wherein the rack guide body and the pressing member are disposed in the gear case with a clearance with respect to the gear case, and the resiliently deformable member is adapted to come into contact with the inner surface of the gear case as the resiliently deformable member is bulged by the imparted pressing force directed toward the rack bar.

According to the rack-and-pinion type steering apparatus in accordance with the invention, the rack guide body can be held by the resiliently deformable member coming into contact with the inner surface of the gear case and in correspondence with the magnitude of the reaction force with respect to the pressing force. Further, since the resiliently pressing force directed toward the rack bar can be produced by the resiliently deformable member, it is possible to reliably avoid the direct contact of the rack guide body with the inner surface of the gear case. Moreover, it is possible to disuse the coil spring and eliminate the occurrence of abnormal noise ascribable to the permanent set of the coil spring.

The rack-and-pinion type steering apparatus in accordance with the present invention may further comprise a screw member which is threadedly secured in the inner surface of the gear case to impart to the pressing member the pressing force directed toward the rack bar. Instead of providing such a screw member, the pressing member at its peripheral surface may be threadedly secured to the inner surface of the gear case. As the pressing member is thus threadedly secured to the inner surface of the gear case, the advancing and retreating position of the pressing member with respect to the gear case can be determined by the rotation of the pressing member. As a result, even if the screw member is not provided, the pressing force directed toward the rack bar can be imparted to the resiliently deformable member by the pressing member itself.

In the rack-and-pinion type steering apparatus in accordance with the present invention, the rack guide may further comprise setting means for setting the pressing force which is imparted from the pressing member to the resiliently deformable member.

According to the rack-and-pinion type steering apparatus, as a result of the fact that the pressing force against the resiliently deformable member by the pressing member can be set by the setting means, the amount of bulge or the hardness of the resiliently deformable member can be set to a predetermined value. Hence, it is possible to easily set an optimal resiliently pressing force at all times without requiring intricate operation.

In a preferred example, the setting means includes a stepped portion of the gear case; a stepped portion of the pressing member which comes into contact with that stepped portion; and a threadedly engaging portion for threadedly engaging the pressing member with the inner surface of the gear case. In the above-described rack-and-pinion type steering apparatus, the gear case preferably includes a small-diameter hollow portion defined by a cylindrical small-diameter inner surface and for accommodating the rack guide body and the resiliently deformable member, as well as a large-diameter hollow portion which is adjacent to the small-diameter hollow portion and defined by a cylindrical large-diameter inner surface. The pressing member preferably includes a small-diameter cylindrical portion disposed in the small-diameter hollow portion and having a small-diameter outer surface, as well as a large-diameter cylindrical portion having a large-diameter outer surface adjacent to the small-diameter cylindrical portion and disposed in the large-diameter hollow portion. The stepped portion of the gear case is interposed between the small-diameter inner surface and the large-diameter inner surface, the stepped portion of the pressing member is interposed between the small-diameter outer surface and the large-diameter outer surface, and the threadedly engaging portion is interposed between the large-diameter inner surface and the large-diameter outer surface.

In the rack-and-pinion type steering apparatus having the setting means, in another preferred example, the gear case has a hollow portion defined by a cylindrical inner surface and for accommodating the rack guide body and the resiliently deformable member, as well as an end face in which one end of the hollow portion is opened, the pressing member has a cylindrical portion which is disposed in the hollow portion, and the setting means includes a collar portion which is provided integrally on the cylindrical portion and has an annular side surface coming into contact the end face, as well as a threadedly engaging portion for allowing the pressing member to threadedly engage the gear case. The threadedly engaging portion is interposed between the cylindrical inner surface and a cylindrical outer surface of the cylindrical portion.

In still another preferred example, the gear case includes a hollow portion defined by a cylindrical inner surface and for accommodating the rack guide body and the resiliently deformable member, the pressing member includes a cylindrical portion having an end face disposed in the hollow portion, and the setting means includes a projection which is provided integrally on the rack guide body in such a manner as to be embedded in the resiliently deformable member and extend toward the end face of the pressing member, and a threadedly engaging portion for allowing the pressing member to threadedly engage the gear case. The threadedly engaging portion is interposed between the cylindrical inner surface and a cylindrical outer surface of the cylindrical portion.

The rack-and-pinion type steering apparatus having the setting means may further comprise a rigid plate interposed between the resiliently deformable member and the pressing member. In addition, each of the rack guide body and the pressing member is preferably formed of a resin.

ADVANTAGEOUS EFFECT OF THE INVENTION

According to the invention, as a result of the fact that the coil spring can be disused, it is possible to provide a rack guide which makes it possible to eliminate the occurrence of abnormal noise ascribable to the permanent set of the coil spring, as well as a rack-and-pinion type steering apparatus using the same.

In addition, according to the present invention, it is possible to provide a rack-and-pinion type steering apparatus which makes it possible to easily set an optimal resiliently pressing force at all times.

BEST MODE FOR CARRYING OUT THE INVENTION

Hereafter, a more detailed description will be given of the mode for carrying out the invention with reference to the preferred embodiments illustrated in the drawings. It should be noted that the invention is not limited by these embodiments.

BRIEF DESCRIPTION OF THE DRAWINGS

FIG. 1 is a cross-sectional view of a preferred embodiment in accordance with the present invention;

FIG. 2 is a cross-sectional view of a rack guide body shown in FIG. 1;

FIG. 3 is a plan view of the rack guide body shown in FIG. 1;

FIG. 4 is a cross-sectional view taken in the direction of arrows along line IV-IV shown in FIG. 3;

FIG. 5 is a perspective view of a resiliently deformable member shown in FIG. 1;

FIG. 6 is a cross-sectional view of a pressing member shown in FIG. 1;

FIG. 7 is a cross-sectional view of another preferred embodiment of the present invention;

FIG. 8 is cross-sectional view of the rack guide body shown in FIG. 7;

FIG. 9 is a side elevational view of the rack guide body shown in FIG. 7;

FIG. 10 is a perspective view of the resiliently deformable member shown in FIG. 7;

FIG. 11 is a cross-sectional view of still another preferred embodiment of the present invention;

FIG. 12 is a plan view of the rack guide body shown in FIG. 11;

FIG. 13 is a cross-sectional view taken in the direction of arrows along line XIII-XIII shown in FIG. 12;

FIG. 14 is a perspective view of the resiliently deformable member shown in FIG. 11;

FIG. 15 is a cross-sectional view of a further preferred embodiment of the present invention;

FIG. 16 is a plan view of the rack guide body shown in FIG. 15;

FIG. 17 is a cross-sectional view taken in the direction of arrows along line XVII-XVII shown in FIG. 16;

FIG. 18 is a perspective view of the resiliently deformable member shown in FIG. 15;

FIG. 19 is a perspective view of a rigid plate shown in FIG. 15;

FIG. 20 is a perspective view of the pressing member shown in FIG. 15;

FIG. 21 is a partial cross-sectional view of a still further preferred embodiment of the present invention;

FIG. 22 is a perspective view of the pressing member shown in FIG. 21;

FIG. 23 is a partial cross-sectional view of a further preferred embodiment of the present invention;

FIG. 24 is a cross-sectional view, taken in the direction of arrows along line XXIV-XXIV, of the rack guide body shown in FIG. 23;

FIG. 25 is a cross-sectional view of a further preferred embodiment of the present invention;

FIG. 26 is a cross-sectional view of the rack guide body shown in FIG. 25;

FIG. 27 is a plan view of the rack guide body shown in FIG. 25;

FIG. 28 is a cross-sectional view, taken in the direction of arrows along line XXVIII-XXVIII, of the rack guide body shown in FIG. 27 and FIG. 29 is a perspective view of the resiliently deformable member shown in FIG. 25.

In FIGS. 1 to 6, a rack-and-pinion type steering apparatus 1 in accordance with this embodiment is comprised of a gear case 3 made of aluminum or an aluminum alloy and having a hollow portion 2; a steering shaft 6 rotatably supported by the gear case 3 through rolling bearings 4 and 5; a pinion 7 which is disposed in the hollow portion 2, is provided integrally on a shaft end portion (pinion shaft) of the steering shaft 6, and is rotatably supported in the gear case 3 through the steering shaft 6; a rack bar 9 on which rack teeth 8 meshing with the pinion 7 are formed; a rack guide 10 which is disposed in the hollow portion 2 inside the gear case 3 and supports the rack bar 9 slidably with respect to its moving direction A; a screw member 13 which is threadedly secured in an inner surface 12 of a cylindrical portion 11 of the gear case 3; and a lock nut 14 which is threadedly engaged with the screw member 13 and abuts against the cylindrical portion 11.

The rack bar 9, which is disposed movably in an orthogonal direction (moving direction A) to the axis of the steering shaft 6 in such a manner as to penetrate the gear case 3 in that orthogonal direction, has a semicylindrical outer peripheral surface 15 on its reverse surface side opposing its surface where the rack teeth 8 are formed.

The rack guide 10 includes a rack guide body 23 which has a semicylindrical concave surface 21 for slidably coming into contact with the semicylindrical outer peripheral surface 15 of the rack bar 9 and has a pressure receiving surface 22 for receiving the pressing force F directed toward the rack bar 9; an annular resiliently deformable member 24 disposed on the pressure receiving surface 22 side of the rack guide body 23; and an annular pressing member 25 for imparting to the resiliently deformable member 24 the pressing force F directed toward the rack bar 9.

The rack guide body 23, which is formed of a metal or a synthetic resin, includes a main body portion 26 having the concave surface 21 and the pressure receiving surface 22; a cylindrical supporting portion 29 which at its one end is provided integrally on the main body portion 26 and is passed through respective through holes 27 and 28 of the resiliently deformable member 24 and the pressing member 25; an elongated bottom groove 30 disposed in the bottom of the concave surface 21 and extending parallel to the moving direction A of the rack bar 9; and a perpendicular elongated groove 31 disposed in the concave surface 21 and extending perpendicularly to the extending direction of the elongated bottom groove 30.

The main body portion 26 has a cylindrical outer peripheral surface 32 in addition to the concave surface 21 and the pressure receiving surface 22. The pressure receiving surface 22 is constituted by an annular perpendicular pressure receiving surface 33 which is perpendicular to the direction of the pressing force F. The rack guide body 23 also has at the other end of the supporting portion 29 a cruciform slit 34 for facilitating the resilient deformation of the other end of the supporting portion 29 to thereby facilitate the insertion of the supporting portion 29 into the through holes 27 and 28, as well as a bulged portion 36 which engages an annular stepped portion 35 of the pressing member 25 so as to prevent the supporting portion 29 from coming off the through hole 28 of the pressing member 25. The elongated bottom groove 30 is wider and deeper than the perpendicular elongated groove 31.

The annular resiliently deformable member 24, which is formed of natural or synthetic rubber or a resin such as a polyurethane elastomer, includes an annular perpendicular pressing surface 41 opposing the perpendicular pressure receiving surface 33 and having a shape corresponding to the perpendicular pressure receiving surface 33; an annular perpendicular pressure receiving surface 43 opposing a perpendicular pressing surface 42 of the pressing member 25 and having a shape corresponding to the perpendicular pressing surface 42 of the pressing member 25; a cylindrical outer peripheral surface 44; the through hole 27 through which the supporting portion 29 is passed; and a cylindrical inner peripheral surface 46 which is movably brought into close contact with a cylindrical outer peripheral surface 45 of the supporting portion 29, and defines the through hole 27. The annular resiliently deformable member 24 is disposed between the perpendicular pressure receiving surface 33 of the rack guide body 23 and the perpendicular pressing surface 42 of the pressing member 25 with respect to the direction of the pressing force F as its perpendicular pressing surface 41 contacts the perpendicular pressure receiving surface 33 and its perpendicular pressure receiving surface 43 contacts the perpendicular pressing surface 42, so as to undergo resilient deformation by the pressing force F directed from the pressing member 25 toward the rack bar 9.

The annular pressing member 25, which is formed of a metal or a synthetic resin, includes the annular perpendicular pressing surface 42 perpendicular to the direction of the pressing force F; the through hole 28 through which the supporting portion 29 is passed; a through hole 47 connected to the through hole 28 and having a larger diameter than the through hole 28; an annular perpendicular pressure receiving surface 48 perpendicular to the direction of the pressing force F; a cylindrical outer peripheral surface 49; a cylindrical inner peripheral surface 50 which is movably brought into close contact with the outer peripheral surface 45 of the supporting portion 29, and defines the through hole 28; a cylindrical inner peripheral surface 51 defining the through hole 47; and the annular stepped portion 35 disposed between the inner peripheral surface 50 and the inner peripheral surface 51.

The main body portion 26 of the rack guide body 23 is disposed in the gear case 3 such that a clearance is provided between its outer peripheral surface 32 and the inner surface 12 of the cylindrical portion 11 of the gear case 3. The pressing member 25 is also disposed in the gear case 3 such that a clearance is provided between its outer peripheral surface 44 and the inner surface 12 of the cylindrical portion 11 of the gear case 3. As a result, each of the rack guide body 23 and the pressing member 25 is movable in the direction of the pressing force F together with the resiliently deformable member 24 with respect to the screw member 13 threadedly secured in the cylindrical portion 11 of the gear case 3, and is movable by the portion of the clearance in the direction perpendicular to the direction of the pressing force F. The resiliently deformable member 24, which is disposed between the rack guide body 23 and the pressing member 25 so as to bulge in the direction perpendicular to the direction of the pressing force F by undergoing resilient deformation by the pressing force F directed from the pressing member 25 toward the rack bar 9, is bulged toward the cylindrical inner surface 12 of the gear case 3 by the imparted pressing force F directed toward the rack bar 9. As the resiliently deformable member 24 is bulged by the thus-imparted pressing force F directed toward the rack bar 9, the resiliently deformable member 24 at its outer peripheral surface 44 is brought into contact with the inner surface 12 of the gear case 3.

The screw member 13 has an annular perpendicular pressing surface 55 which opposes and contacts the perpendicular pressure receiving surface 48 and has a shape corresponding to the perpendicular pressure receiving surface 48. The screw member 13 is adapted to impart to the pressing member 25 the pressing force F directed toward the rack bar 9.

In the above-described rack-and-pinion type steering apparatus 1, after the screw member 13 is threadedly inserted into the cylindrical portion 11 to impart a fixed pressing force F to the pressing member 25, the screw member 13 is fixed to the cylindrical portion 11 by the lock nut 14. Then, the pressing force F imparted to the pressing member 25 resiliently deforms the resiliently deformable member 24, and is transmitted to the rack guide body 23. As a result, the rack guide body 23 at its concave surface 21 slidably resiliently supports the rack bar 9 by the resiliency in the direction of the pressing force F ascribable to the resilient deformation of the resiliently deformable member 24. In the rotation of the steering shaft 6, the rack guide body 23 ensures the meshing of the rack teeth 8 with the pinion 7, reduces the knocking sounds at the meshing portions between the rack teeth 8 and the pinion 7, and guides the movement of the rack bar 9 in the orthogonal direction to the axis of the steering shaft 6 owing to the meshing. Moreover, the resiliently deformable member 24 bulges toward the cylindrical inner surface 12 of the gear case 3 owing to its resilient deformation caused by the imparted pressing force F directed toward the rack bar 9, and thereby comes into contact with the inner surface 12 of the gear case 3 at its outer peripheral surface 44. Further, the resiliently deformable member 24 is capable of changing the amount of its bulge or hardness in correspondence with the magnitude of the reaction force with respect to the pressing force F. As a result, it is possible to reliably avoid the direct contact of the rack guide body 23 with the inner surface 12 of the gear case 3. Even if bouncing occurs in the rack guide body 23, it is possible to avoid a collision between the rack guide body 23 and the inner surface 12 of the gear case 3, thereby making it possible to prevent the occurrence of abnormal noise due to the collision. Moreover, in the rack guide 10, since the resiliently deformable member 24 is clamped between the perpendicular pressure receiving surface 33 of the rack guide body 23 and the perpendicular pressing surface 42 of the pressing member 25, it is possible to reduce the permanent set of the resiliently deformable member 24 due to its creep deformation and impart stable resiliently pressing force F to the rack bar 9.

Thus, according to the rack-and-pinion type steering apparatus 1, since the resiliently pressing force F directed toward the rack bar 9 can be produced by the resiliently deformable member 24, it is possible to avoid the direct contact of the rack guide body 23 with the inner surface 12 of the gear case 3. Moreover, it is possible to disuse the coil spring and eliminate the occurrence of abnormal noise ascribable to the permanent set of the coil spring.

Described above is an example of the rack guide 10 which is provided with the main body portion 26 having the perpendicular pressure receiving surface 33 as the pressure receiving surface 22. Alternatively, as shown in FIGS. 7 to 9, it is possible to use the rack guide 10 which is provided with the main body portion 26 having a pair of inclined pressure receiving surfaces 61 and 62 as the pressure receiving surface 22. Namely, the pressure receiving surface 22 of the main body portion 26 shown in FIGS. 7 to 9 includes the pair of inclined pressure receiving surfaces 61 and 62 which are inclined with respect to the direction of the pressing force F in such a manner as to be gradually spaced apart from each other in the direction of the pressing force F, and which respectively have a pair of end edges 63 and 64 parallel to the moving direction A of the rack bar 9 and in the direction of the pressing force F, as well as a pair of end edges 65 and 66 parallel to the moving direction A of the rack bar 9 and in the direction opposing the direction of the pressing force F, the interval therebetween being narrower than the mutual interval between the pair of end edges 63 and 64; a pair of perpendicular pressure receiving surfaces 67 and 68 which are respectively contiguous to the end edges 63 and 64 and are perpendicular to the direction of the pressing force F; and perpendicular pressure receiving surfaces 69 and 70 which are respectively contiguous to the end edges 65 and 66 and are perpendicular to the direction of the pressing force F.

In the case of the rack guide 10 having the main body portion 26 shown in FIGS. 7 to 9, as particularly shown in FIG. 10, the annular resiliently deformable member 24 includes a pair of inclined pressing surfaces 81 and 82 which oppose the pair of inclined pressure receiving surfaces 61 and 62 constituted by straight flat surfaces and have shapes corresponding to the pair of inclined pressure receiving surfaces 61 and 62; a pair of perpendicular pressing surfaces 83 and 84 opposing the perpendicular pressure receiving surfaces 67 and 68 and having shapes corresponding to the perpendicular pressure receiving surfaces 67 and 68; and perpendicular pressing surfaces 85 and 86 opposing the perpendicular pressure receiving surfaces 69 and 70 and having shapes corresponding to the perpendicular pressure receiving surfaces 69 and 70. The annular resiliently deformable member 24 is disposed between, on the one hand, the perpendicular pressing surface 42 of the pressing member 25 and, on the other hand, the pair of perpendicular pressure receiving surfaces 67 and 68, the pair of inclined pressure receiving surfaces 61 and 62, and the perpendicular pressure receiving surfaces 69 and 70 of the rack guide body 23 with respect to the direction of the pressing force F. Each of the pair of inclined pressure receiving surfaces 61 and 62 and each of the pair of inclined pressing surfaces 81 and 82 constituted by straight flat surfaces are in contact with each other; each of the pair of perpendicular pressure receiving surfaces 67 and 68 and each of the pair of perpendicular pressing surfaces 83 and 84 are in contact with each other; the perpendicular pressure receiving surfaces 69 and 70 and the perpendicular pressing surfaces 85 and 86 are in contact with each other; and the perpendicular pressure receiving surface 43 and the perpendicular pressing surface 42 are in contact with each other.

Also in the rack-and-pinion type steering apparatus 1 having the rack guide 10 shown in FIGS. 7 to 10, the pressing force F imparted to the pressing member 25 resiliently deforms the resiliently deformable member 24, and is transmitted to the rack guide body 23. As a result, the rack guide body 23 at its concave surface 21 slidably resiliently supports the rack bar 9 by the resiliency in the direction of the pressing force F ascribable to the resilient deformation of the resiliently deformable member 24. In the rotation of the steering shaft 6, the rack guide body 23 ensures the meshing of the rack teeth 8 with the pinion 7, reduces the knocking sounds at the meshing portions between the rack teeth 8 and the pinion 7, and guides the movement of the rack bar 9 in the orthogonal direction to the axis of the steering shaft 6 owing to the meshing. Moreover, the resiliently deformable member 24 bulges toward the cylindrical inner surface 12 of the gear case 3 owing to its resilient deformation caused by the imparted pressing force F directed toward the rack bar 9, and thereby comes into contact with the inner surface 12 of the gear case 3 at its outer peripheral surface 44. Further, the resiliently deformable member 24 is capable of changing the amount of its bulge or hardness in correspondence with the magnitude of the reaction force with respect to the pressing force F. As a result, it is possible to reliably avoid the direct contact of the rack guide body 23 with the inner surface 12 of the gear case 3. Even if bouncing occurs in the rack guide body 23, it is possible to avoid a collision between the rack guide body 23 and the inner surface 12 of the gear case 3, thereby making it possible to prevent the occurrence of abnormal noise due to the collision. Moreover, in the rack guide 10 shown in FIGS. 7 to 10, the resiliently deformable member 24 is clamped between, on the one hand, the perpendicular pressing surface 42 of the pressing member 25 and, on the other hand, the pair of perpendicular pressure receiving surfaces 67 and 68, the pair of inclined pressure receiving surfaces 61 and 62, and the perpendicular pressure receiving surfaces 69 and 70 of the rack guide body 23; therefore, it is possible to reduce the permanent set of the resiliently deformable member 24 due to its creep deformation and impart stable resiliently pressing force F to the rack bar 9. Furthermore, since the rack guide body 23 receives the pressing force F directed toward the rack bar 9 through the inclined pressure receiving surfaces 61 and 62, in the case where the rack guide body 23 has slight resilient deformability, the rack bar 9 is supported from both diagonal sides through the rack guide body 23. In consequence, the rack bar 9 is slidably supported more stably.

In the rack guide 10 shown in FIGS. 7 to 10, each of the pair of inclined pressure receiving surfaces 61 and 62 and the pair of inclined pressing surfaces 81 and 82 is constituted by a straight flat surface. Alternatively, however, as shown in FIGS. 11 to 14, each of the pair of inclined pressure receiving surfaces 61 and 62 and the pair of inclined pressing surfaces 81 and 82 may be constituted by a semicylindrical curved surface. The pressure receiving surface 22 of the main body portion 26 shown in FIGS. 11 to 13 includes the pair of inclined pressure receiving surfaces 61 and 62 respectively constituted by semicylindrical curved surfaces which are inclined with respect to the direction of the pressing force F in such a manner as to be gradually spaced apart from each other in the direction of the pressing force F, and which respectively have the pair of end edges 63 and 64 parallel to the moving direction A of the rack bar 9 and in the direction of the pressing force F; and the pair of perpendicular pressure receiving surfaces 67 and 68 which are respectively contiguous to the end edges 63 and 64 and are perpendicular to the direction of the pressing force F. The pair of inclined pressure receiving surfaces 61 and 62 are contiguous to each other at the pair of end edges 65 and 66 in the direction opposing the direction of the pressing force F.

In the case of the rack guide 10 having the main body portion 26 shown in FIGS. 11 to 13, as particularly shown in FIG. 14, the annular resiliently deformable member 24 includes, in addition to the outer peripheral surface 44 and the perpendicular pressure receiving surface 43, the pair of inclined pressing surfaces 81 and 82 respectively constituted by semicylindrical curved surfaces, opposing the pair of inclined pressure receiving surfaces 61 and 62 constituted by semicylindrical curved surfaces, and having shapes corresponding to the pair of inclined pressure receiving surfaces 61 and 62; as well as the pair of perpendicular pressing surfaces 83 and 84 opposing the perpendicular pressure receiving surfaces 67 and 68 and having shapes corresponding to the perpendicular pressure receiving surfaces 67 and 68. The annular resiliently deformable member 24 is disposed between, on the one hand, the perpendicular pressing surface 42 of the pressing member 25 and, on the other hand, the pair of inclined pressure receiving surfaces 61 and 62 and the pair of perpendicular pressure receiving surfaces 67 and 68 of the rack guide body 23 with respect to the direction of the pressing force F. The pair of inclined pressing surfaces 81 and 82 are contiguous to each other; each of the pair of inclined pressure receiving surfaces 61 and 62 and each of the pair of inclined pressing surfaces 81 and 82 are in contact with each other; each of the pair of perpendicular pressure receiving surfaces 67 and 68 and each of the pair of perpendicular pressing surfaces 83 and 84 are in contact with each other; and the perpendicular pressure receiving surface 43 and the perpendicular pressing surface 42 are in contact with each other.

In the rack guide 10 shown in FIGS. 11 to 14, the rack guide body 23 includes, in addition to the semicylindrical concave surface 21, tapered surfaces 91 and 92 provided on both ends of the concave surface 21 in the moving direction A. The rack guide body 23 has the perpendicular elongated groove 31 disposed in the concave surface 21 and extending perpendicularly to the moving direction A of the rack bar 9.

Also with the rack-and-pinion type steering apparatus 1 having the rack guide 10 shown in FIGS. 11 to 14, it is possible to obtain advantages similar to those of the above-described rack-and-pinion type steering apparatus 1.

Although in the foregoing embodiments the screw member 13 is threadedly inserted into the cylindrical portion 11 to impart the fixed pressing force F to the pressing member 25, the screw member 13 may be omitted, and the pressing member 25 at its outer peripheral surface 49 may be threadedly secured to the inner surface 12 of the gear case 3 so as to impart the fixed pressing force F to the resiliently deformable member 24 as the pressing member 25 is threadedly inserted into the cylindrical portion 11.

A rack-and-pinion type steering apparatus 101 in accordance with still another preferred embodiment of the present invention shown in FIGS. 15 to 20 is comprised of a gear case 103 made of aluminum or an aluminum alloy and having a hollow portion 102; the steering shaft 6 rotatably supported by the gear case 103 through the rolling bearings 4 and 5; the pinion 7 which is disposed in the hollow portion 102, is provided integrally on the shaft end portion (pinion shaft) of the steering shaft 6, and is rotatably supported in the gear case 103 through the steering shaft 6; the rack bar 9 on which the rack teeth 8 meshing with the pinion 7 are formed; and a rack guide 110 which is disposed in the hollow portion 102 inside the gear case 103 and supports the rack bar 9 slidably with respect to its moving direction A.

The gear case 103 having a cylindrical portion 120 includes inside the cylindrical portion 120 a small-diameter hollow portion 115 defined by a small-diameter inner surface 114 and for accommodating a rack guide body 111 of the rack guide 110, a resiliently deformable member 112, and a rigid plate 113, as well as a large-diameter hollow portion 118 which is adjacent to the hollow portion 115 and defined by a cylindrical large-diameter inner surface 116 and which accommodates a pressing member 117 of the rack guide 110.

The rack bar 9, which is disposed movably in the orthogonal direction A to the axis of the steering shaft 6 in such a manner as to penetrate the gear case 103 in that orthogonal direction A, has the semicylindrical outer peripheral surface 15 on its reverse surface side opposing its surface where the rack teeth 8 are formed.

The rack guide 110 includes the rack guide body 111 which has a semicylindrical concave surface 121 for slidably coming into contact with the outer peripheral surface 15 of the rack bar 9 and has a pressure receiving surface 122 for receiving the pressing force F directed toward the rack bar 9; the resiliently deformable member 112 disposed on the pressure receiving surface 122 side of the rack guide body 111; the pressing member 117 for imparting to the resiliently deformable member 112 the pressing force F directed toward the rack bar 9; a setting means 123 for setting the pressing force F to be imparted to the resiliently deformable member 112 by the pressing member 117; and the disk-shaped rigid plate 113 interposed between the resiliently deformable member 112 and the pressing member 117.

The rack guide body 111, which is formed of a metal or a synthetic resin, includes a main body portion 126 having the concave surface 121 and the pressure receiving surface 122, as well as a cylindrical supporting portion 130 which at its one end is provided integrally on the main body portion 126 and is passed through respective through holes 127, 128, and 129 of the resiliently deformable member 112, the pressing member 117, and the rigid plate 113.

The main body portion 126 has a cylindrical outer peripheral surface 131 in addition to the concave surface 121 and the pressure receiving surface 122. The pressure receiving surface 122 has a semicylindrical curved pressure receiving convex surface 132 as well as a pair of perpendicular pressure receiving surfaces 133 and 134 contiguous to the curved pressure receiving convex surface 132 and perpendicular to the direction of the pressing force F. The main body portion 126 is disposed in the cylindrical portion 120 of the gear case 103 such that a clearance is provided between its outer peripheral surface 131 and the small-diameter inner surface 114.

The supporting portion 130 has at its other end a cruciform slit 135 for facilitating the resilient deformation of that other end to thereby facilitate its insertion into the through holes 127, 128, and 129, as well as a bulged portion 137 which engages an annular stepped portion 136 of the pressing member 117 so as to prevent the supporting portion 130 from coming off the through hole 129 of the pressing member 117.

The resiliently deformable member 112 formed of natural or synthetic rubber or a resin such as a polyurethane elastomer includes a curved pressing concave surface 141 which opposes and contacts the curved pressure receiving convex surface 132 and has a shape corresponding to the curved pressure receiving convex surface 132; a pair of perpendicular pressing surfaces 142 and 143 which oppose and contact the flat perpendicular pressure receiving surfaces 133 and 134 and have shapes corresponding to the flat perpendicular pressure receiving surfaces 133 and 134; an annular perpendicular flat surface 145 which opposes and contacts one annular perpendicular flat surface 144 of the rigid plate 113 and has a shape corresponding to the perpendicular flat surface 144 perpendicular to the direction of the pressing force F; a cylindrical outer peripheral surface 146; the through hole 127 through which the supporting portion 130 is passed; and a cylindrical inner peripheral surface 148 which is movably brought into close contact with a cylindrical outer peripheral surface 147 of the supporting portion 130, and defines the through hole 127. The annular resiliently deformable member 112 is disposed between, on the one hand, the perpendicular flat surface 144 of the rigid plate 113 and, on the other hand, the curved pressure receiving convex surface 132 and the pair of perpendicular pressure receiving surfaces 133 and 134 of the rack guide body 111 with respect to the direction of the pressing force F, so as to undergo resilient deformation by the pressing force F directed from the pressing member 117 toward the rack bar 9 through the rigid plate 113.

The resiliently deformable member 112, which is disposed between the main body portion 126 of the rack guide body 111 and the pressing member 117 so as to bulge in the direction perpendicular to the direction of the pressing force F by undergoing resilient deformation by the pressing force F directed from the pressing member 117 toward the rack bar 9, is bulged toward the small-diameter inner surface 114 of the cylindrical portion 120 of the gear case 103 by the imparted pressing force F directed toward the rack bar 9. As the resiliently deformable member 112 is bulged by the thus-imparted pressing force F directed toward the rack bar 9, the resiliently deformable member 112 at its outer peripheral surface 146 is brought into contact with the small-diameter inner surface 114 of the gear case 103.

The annular pressing member 117, which is formed of a metal or a synthetic resin, includes a small-diameter cylindrical portion 152 disposed in the small-diameter hollow portion 115 and having a small-diameter outer surface 151; a large-diameter cylindrical portion 154 adjacent to the small-diameter cylindrical portion 152, disposed in the large-diameter hollow portion 118, and having a large-diameter outer surface 153; the through hole 129 through which the supporting portion 130 is passed; and a through hole 155 communicating with the through hole 129 and having a diameter larger than that of the through hole 129. The small-diameter cylindrical portion 152 has an annular perpendicular pressing surface 157 which is perpendicular to the direction of the pressing force F and opposes and contacts another annular perpendicular flat surface 156 of the rigid plate 113, and which has a shape corresponding to the perpendicular flat surface 156.

The setting means 123 includes an annular stepped portion 161 of the gear case 103 for accommodating the rack guide body 111 and the resiliently deformable member 112; an annular stepped portion 162 of the pressing member 117 which comes into contact with the stepped portion 161; and a threadedly engaging portion 163 for threadedly engaging the pressing member 117 with the large-diameter inner surface 116, which is the inner surface of the gear case 103. The stepped portion 161 is interposed between the small-diameter inner surface 114 and the large-diameter inner surface 116. The stepped portion 162 is interposed between the small-diameter outer surface 151 and the large-diameter outer surface 153. The threadedly engaging portion 163 is constituted by a female thread 164 cut in the large-diameter inner surface 116 and a male thread 165 cut in the large-diameter outer surface 153, and is interposed between the large-diameter inner surface 116 and the large-diameter outer surface 153.

The annular rigid plate 113 having an outside diameter substantially identical to the diameter of the small-diameter outer surface 151 includes the perpendicular flat surface 144, the perpendicular flat surface 156, and the through hole 128, and is disposed in the hollow portion 115. In this embodiment, the rigid plate 113 may be omitted, and the perpendicular pressing surface 157 of the pressing member 117 may be directly brought into contact with the perpendicular flat surface 145 of the resiliently deformable member 112.

In the above-described rack-and-pinion type steering apparatus 101, when the pressing member 117 is threadedly inserted into the cylindrical portion 120 by the threaded engagement of the male thread 165 with the female thread 164 to cause the stepped portion 162 to come into contact with the stepped portion 161, and the fixed pressing force F is thereby imparted to the resiliently deformable member 112 through the rigid plate 113, the pressing force F imparted to the resiliently deformable member 112 resiliently deforms the resiliently deformable member 112, and is transmitted to the rack guide body 111. As a result, the rack guide body 111 at its concave surface 121 slidably resiliently supports the rack bar 9 by the resiliency in the direction of the pressing force F ascribable to the resilient deformation of the resiliently deformable member 112. In the rotation of the steering shaft 6, the rack guide body 111 ensures the meshing of the rack teeth 8 with the pinion 7, reduces the knocking sounds at the meshing portions between the rack teeth 8 and the pinion 7, and guides the movement of the rack bar 9 in the direction A owing to the meshing. Moreover, the resiliently deformable member 112 bulges toward the small-diameter inner surface 114, which is the cylindrical inner surface of the gear case 103, owing to its resilient deformation caused by the imparted pressing force F directed toward the rack bar 9, and thereby comes into contact with the small-diameter inner surface 114 at its outer peripheral surface 146. Further, the resiliently deformable member 112 is capable of changing the amount of its bulge or hardness in correspondence with the magnitude of the reaction force with respect to the pressing force F. As a result, it is possible to reliably avoid the direct contact of the rack guide body 111 with the small-diameter inner surface 114. Even if bouncing occurs in the rack guide body 111, it is possible to avoid a collision between the rack guide body 111 and the small-diameter inner surface 114, thereby making it possible to prevent the occurrence of abnormal noise due to the collision. In addition, in the rack guide 110, since the resiliently deformable member 112 is clamped between, on the one hand, the perpendicular pressure receiving surfaces 133 and 134 of the rack guide body 111 and, on the other hand, the perpendicular flat surface 144 of the rigid plate 113, it is possible to reduce the permanent set of the resiliently deformable member 112 due to its creep deformation and impart stable resiliently pressing force F to the rack bar 9. Moreover, as a result of the fact that the pressing force F with respect to the resiliently deformable member 112 by the pressing member 117 can be set by the threaded engagement at the threadedly engaging portion 163 and the contact of the stepped portion 162 with the stepped portion 161 in the setting means 123, the amount of bulge or the hardness of the resiliently deformable member 112 can be set to a predetermined value.

Thus, according to the rack-and-pinion type steering apparatus 101, since the resiliently pressing force F directed toward the rack bar 9 can be produced by the resiliently deformable member 112, it is possible to avoid the direct contact of the rack guide body 111 with the small-diameter inner surface 114. Moreover, it is possible to disuse the coil spring and eliminate the occurrence of abnormal noise ascribable to the permanent set of the coil spring. Furthermore, it is possible to easily set an optimal resiliently pressing force F at all times without requiring intricate operation.

In the present invention, instead of the setting means 123 having the stepped portions 161 and 162, it is possible to use the setting means 123 which does not have the stepped portions 161 and 162, as shown in FIGS. 21 and 22. Namely, in the rack-and-pinion type steering apparatus 101 having the setting means 123 shown in FIGS. 21 and 22, instead of the hollow portion 115 and the hollow portion 118 of the different diameters the gear case 103 having the cylindrical portion 120 has in its cylindrical portion 120 a hollow portion 172 of the same diameter, which is defined by a cylindrical inner surface 171 of the same diameter and which accommodates the rack guide body 111, the resiliently deformable member 112, and the rigid plate 113. One end of the hollow portion 172 is opened in an annular end face 173 of the cylindrical portion 120, and the pressing member 117 includes a cylindrical portion 176 which is disposed in the hollow portion 172 and has an annular end face 174, a cylindrical outer surface 175, and the through hole 129. The end face 174 opposes and contacts the perpendicular flat surface 156 of the rigid plate 113 and has a shape corresponding to the perpendicular flat surface 156. The setting means 123 includes a collar portion 178 which is provided integrally on the cylindrical portion 176 and has an annular side surface 177 coming into contact the end face 173, as well as a threadedly engaging portion 179 for allowing the pressing member 117 to threadedly engage the cylindrical portion 120 of the gear case 103. The threadedly engaging portion 179 is constituted by the female thread 164 cut in the inner surface 171 and the male thread 165 cut in the outer surface 175, and is interposed between the cylindrical inner surface 171 and the cylindrical outer surface 175 of the cylindrical portion 176.

Also in the rack-and-pinion type steering apparatus 101 having the setting means 123 shown in FIGS. 21 and 22, as the pressing member 117 is threadedly inserted into the cylindrical portion 120 by the threaded engagement of the male thread 165 with the female thread 164 to cause the side surface 177 to come into contact with the end face 173, the fixed pressing force F can be thereby imparted to the resiliently deformable member 112 through the rigid plate 113. As a result, it is possible to impart stable resiliently pressing force F to the rack bar 9. Moreover, as a result of the fact that the pressing force F with respect to the resiliently deformable member 112 by the pressing member 117 can be set by the threaded engagement at the threadedly engaging portion 179 and by the contact of the side surface 177 with the end face 173 in the setting means 123, the amount of bulge or the hardness of the resiliently deformable member 112 can be set to a predetermined value. Hence, it is possible to easily set an optimal resiliently pressing force F at all times without requiring intricate operation.

Instead of the setting means 123 having the stepped portions 161 and 162 or the collar portion 178, it is possible to use the setting means 123 which does not have the stepped portions 161 and 162 or the collar portion 178, as shown in FIGS. 23 and 24. Namely, instead of the stepped portions 161 and 162 or the collar portion 178, the setting means 123 shown in FIGS. 23 and 24 has a plurality of columnar projections 181 which are provided integrally on the curved pressure receiving convex surface 132 of the pressure receiving surface 122 in the main body portion 126 of the rack guide body 111 in such a manner as to be embedded in the resiliently deformable member 112 and extend toward the end face 174 of the pressing member 117 up to the vicinity of the perpendicular flat surface 144 of the rigid plate 113. Also in the rack-and-pinion type steering apparatus 101 having the setting means 123 constituted by the above-described projections 181 and the threadedly engaging portion 179, it is possible to impart the fixed pressing force F to the resiliently deformable member 112 through the rigid plate 113 while the perpendicular flat surface 144 of the rigid plate 113 being brought into close proximity to the tips of the projections 181 as the pressing member 117 is threadedly inserted into the cylindrical portion 120 by the threaded engagement of the male thread 165 with the female thread 164. Moreover, stable resiliently pressing force F can be imparted to the rack bar 9 by the restraint of the compression by more than a fixed degree of the resiliently deformable member 112 by the projections 181. Thus, as a result of the fact that the pressing force F against the resiliently deformable member 112 by the pressing member 117 can be set by the threaded engagement at the threadedly engaging portion 179 and by the restraint of the compression by more than a fixed degree of the resiliently deformable member 112 by the projections 181 in the setting means 123, the amount of bulge or the hardness of the resiliently deformable member 112 can be set to a predetermined value. Hence, it is possible to easily set an optimal resiliently pressing force F at all times without requiring intricate operation.

Although in the above-described embodiment the rack guide body 111 is used which has the curved pressure receiving convex surface 132 and the pair of perpendicular pressure receiving surfaces 133 and 134, the rack guide body 111 such as the one shown in FIGS. 25 to 28 may alternatively be used. In the rack guide body 111 shown in FIGS. 25 to 28, its main body portion 126 includes, instead of the curved pressure receiving convex surface 132 and the pair of perpendicular pressure receiving surfaces 133 and 134, one annular perpendicular pressure receiving surface 191 which is perpendicular to the direction of the pressing force F and receives the pressing force F directed from the resiliently deformable member 112 toward the rack bar 9; an elongated bottom groove 192 disposed in the bottom of the concave surface 121 and extending parallel to the direction A of the rack bar 9; and a perpendicular elongated groove 193 disposed in the concave surface 121 and extending perpendicularly to the extending direction of the elongated bottom groove 192. A lubricating oil such as grease is accumulated in the elongated bottom groove 192 and the perpendicular elongated groove 193 which is narrower and shallower than the elongated bottom groove 192. For the rack guide body 111 shown in FIGS. 25 to 28, a cylindrical or a disk-shaped resiliently deformable member 112 as shown in FIG. 29 is used which has the through hole 127 and annular flat pressing surfaces 194 and 195 which are perpendicular to the direction of the pressing force F. The one flat pressing surface 194 opposes and contacts the perpendicular pressure receiving surface 191 and has a shape corresponding to the perpendicular pressure receiving surface 191, while the other flat pressing surface 195 opposes and contacts the perpendicular flat surface 144 of the rigid plate 113. Also with the above-described rack guide body 111 shown in FIGS. 25 to 28, as a result of the fact that the pressing force F against the resiliently deformable member 112 by the pressing member 117 can be set by the setting means 123, the amount of bulge or the hardness of the resiliently deformable member 112 can be set to a predetermined value.

What is claimed is:

1. A rack guide for a rack-and-pinion type steering apparatus, comprising:

a rack guide body having a concave surface which slidably comes into contact with a rack bar and having a pressure receiving surface for receiving a pressing force directed toward the rack bar, the direction of said pressing force being perpendicular to a rotational axis of a pinion with which the rack bar is meshed;

a resiliently deformable member disposed on a side of the pressure receiving surface of said rack guide body; and a pressing member for imparting to said resiliently deformable member the pressing force directed toward the rack bar, wherein said resiliently deformable member is disposed between said rack guide body and said pressing member so as to bulge in a direction perpendicular to the direction of the pressing force by being resiliently deformed by the pressing force directed from said pressing member toward the rack bar, said resiliently deformable member having a first through hole, said pressing member having a second through hole which is communicated with the first through hole in series in the direction of the pressing force, said rack guide body including a main body portion having the concave surface and the pressure receiving surface, and a supporting portion which at its one end is provided integrally on the main body portion and is passed through each of the first and second through holes, said resiliently deformable member being disposed between the main body portion and said pressing member in the direction of the pressing force, the supporting portion having at another end thereof a slit for facilitating the insertion of the supporting portion into the first and second through holes, and at the other end thereof a bulged portion which bulges from the other end of the supporting portion in a direction perpendicular to the direction of the pressing force, said bulged portion coming into contact with said pressing member to be engaged with said pressing member so as to prevent the supporting portion from coming off the second through hole.

2. The rack guide according to claim 1, wherein the pressure receiving surface has a perpendicular pressure receiving surface perpendicular to the direction of the pressing force, and said resiliently deformable member includes a perpendicular pressing surface opposing the perpendicular pressure receiving surface and having a shape corresponding to the perpendicular pressure receiving surface, and is disposed between the perpendicular pressure receiving surface and said pressing member with respect to the direction of the pressing force.

3. The rack guide according to claim 2, wherein the perpendicular pressure receiving surface and the perpendicular pressing surface are in contact with each other.

4. The rack guide according to claim 1, wherein the pressure receiving surface includes a pair of inclined pressure receiving surfaces which are inclined with respect to the direction of the pressing force in such a manner as to be gradually spaced apart from each other in the direction of the pressing force, as well as a pair of perpendicular pressure receiving surfaces which are respectively contiguous to end edges of the pair of inclined pressure receiving surfaces in the direction of the pressing force and are perpendicular to the direction of the pressing force, and wherein said resiliently deformable member includes a pair of inclined pressing surfaces opposing the pair of inclined pressure receiving surfaces and having shapes corresponding to the pair of inclined pressure receiving surfaces, as well as a pair of perpendicular pressing surfaces opposing the pair of perpendicular pressure receiving surfaces and having shapes corresponding to the perpendicular pressure receiving surfaces, and is disposed between, on the one hand, said pressing member and, on the other hand, the inclined pressure receiving surfaces and the perpendicular pressure receiving surfaces with respect to the direction of the pressing force.

5. The rack guide according to claim 4, wherein the end edges of the pair of inclined pressure receiving surfaces in the direction of the pressing force are parallel to a moving direction of the rack bar.

6. The rack guide according to claim 4, wherein each of the inclined pressure receiving surfaces and the inclined pressing surfaces is a straight flat surface or a curved surface.

7. The rack guide according to claim 4, wherein the inclined pressure receiving surface and the inclined pressing surface are in contact with each other, and the perpendicular pressure receiving surface and the perpendicular pressing surface are in contact with each other.

8. The rack guide according to claim 4, wherein the pair of inclined pressure receiving surfaces are contiguous with each other, and the pair of inclined pressing surfaces are contiguous with each other.

9. The rack guide according to claim 4, wherein the pair of inclined pressure receiving surfaces respectively have other end edges which are located in the direction opposing the direction of the pressing force and which are parallel to the moving direction of the rack bar, an interval between the other end edges being narrower than a mutual interval between the pair of end edges in the direction of the pressing force, wherein the pressure receiving surface has another perpendicular pressure receiving surface which is contiguous to each of the other end edges and is perpendicular to the direction of the pressing force, and wherein said resiliently deformable member includes another perpendicular pressing surface opposing the other perpendicular pressure receiving surface and having a shape corresponding to the other perpendicular pressure receiving surface, and is disposed between the other perpendicular pressure receiving surface and said pressing member with respect to the direction of the pressing force.

10. The rack guide according to claim 9, wherein the other perpendicular pressure receiving surface and the other perpendicular pressing surface are in contact with each other.

11. The rack guide according to claim 1, wherein said pressing member has a perpendicular pressing surface perpendicular to the direction of the pressing force, and said resiliently deformable member has a perpendicular pressure receiving surface opposing the perpendicular pressing surface of said pressing member and having a shape corresponding to the perpendicular pressing surface of said pressing member, and is disposed between said rack guide body and the perpendicular pressing surface of said pressing member with respect to the direction of the pressing force.

12. The rack guide according to claim 11, wherein the perpendicular pressure receiving surface of said resiliently deformable member and the perpendicular pressing surface of said pressing member are in contact with each other.

13. The rack guide according to claim 1, wherein said rack guide body has a perpendicular elongated groove disposed in the concave surface and extending perpendicularly to the moving direction of the rack bar.

14. The rack guide according to claim 1, wherein said rack guide body has an elongated bottom groove disposed in a bottom of the concave surface and extending parallel to the moving direction of the rack bar.

15. The rack guide according to claim 1, wherein said rack guide body has a perpendicular elongated groove disposed in the concave surface and extending perpendicularly to the moving direction of the rack bar and an elongated bottom groove disposed in a bottom of the concave surface and extending parallel to the moving direction of the rack bar, the elongated bottom groove being wider and deeper than the perpendicular elongated groove.

16. The rack guide according to claim 1, wherein said rack guide body or said pressing member is formed of a metal or a synthetic resin.

17. The rack guide according to claim 1, wherein said resiliently deformable member is formed of natural or synthetic rubber or a resin including polyurethane elastomer.

18. A rack-and-pinion type steering apparatus comprising:
a gear case;
a pinion which is rotatably supported in said gear case;
a rack bar on which teeth meshing with said pinion are formed; and
the rack guide according to claim 1 for slidably supporting said rack bar,
wherein said rack guide body and said pressing member are disposed in said gear case with a clearance with respect to an inner surface of said gear case, and said resiliently deformable member is adapted to come into contact with the inner surface of said gear case as said resiliently deformable member is bulged by the imparted pressing force directed toward said rack bar.

19. The rack-and-pinion type steering apparatus according to claim 18, further comprising a screw member which is threadedly secured in the inner surface of said gear case to impart to said pressing member the pressing force directed toward said rack bar.

20. The rack-and-pinion type steering apparatus according to claim 18, wherein said pressing member at its peripheral surface is threadedly secured to the inner surface of said gear case.

21. The rack-and-pinion type steering apparatus according to claim 18, wherein said rack guide further comprises setting means for setting the pressing force which is imparted from said pressing member to said resiliently deformable member.

22. The rack-and-pinion type steering apparatus according to claim 21, wherein said setting means includes a stepped portion of said gear case; a stepped portion of said pressing member which comes into contact with said stepped portion of said gear case; and a threadedly engaging portion for threadedly engaging said pressing member with the inner surface of said gear case.

23. The rack-and-pinion type steering apparatus according to claim 22, wherein said gear case includes a small-diameter hollow portion defined by a cylindrical small-diameter inner surface and for accommodating said rack guide body and said resiliently deformable member, as well as a large-diameter hollow portion which is adjacent to the small-diameter hollow portion and defined by a cylindrical large-diameter inner surface, and wherein said pressing member includes a small-diameter cylindrical portion disposed in the small-diameter hollow portion and having a small-diameter outer surface, as well as a large-diameter cylindrical portion having a large-diameter outer surface adjacent to the small-diameter cylindrical portion and disposed in the large-diameter hollow portion, the stepped portion of said gear case being interposed between the small-diameter inner surface and the large-diameter inner surface, the stepped portion of said pressing member being interposed between the small-diameter outer surface and the large-diameter outer surface, the threadedly engaging portion being interposed between the large-diameter inner surface and the large-diameter outer surface.

24. The rack-and-pinion type steering apparatus according to claim 21, wherein said gear case has a hollow portion defined by a cylindrical inner surface and for accommodating said rack guide body and said resiliently deformable member, as well as an end face in which one end of the hollow portion is opened, said pressing member has a cylindrical portion which is disposed in the hollow portion, and said setting means includes a collar portion which is provided integrally on the cylindrical portion and has an annular side surface coming into contact the end face, as well as a threadedly engaging portion for allowing said pressing member to threadedly engage said gear case, the threadedly engaging portion being interposed between the cylindrical inner surface and a cylindrical outer surface of the cylindrical portion.

25. The rack-and-pinion type steering apparatus according to claim 21, wherein said gear case includes a hollow portion defined by a cylindrical inner surface and for accommodating said rack guide body and said resiliently deformable member, said pressing member includes a cylindrical portion having an end face disposed in the hollow portion, and said setting means includes a projection which is provided integrally on said rack guide body in such a manner as to be embedded in said resiliently deformable member and extend toward the end face of said pressing member, and a threadedly engaging portion for allowing said pressing member to threadedly engage said gear case, the threadedly engaging portion being interposed between the cylindrical inner surface and a cylindrical outer surface of the cylindrical portion.

26. The rack-and-pinion type steering apparatus according to claim 21, further comprising a rigid plate interposed between said resiliently deformable member and said pressing member.

27. The rack-and-pinion type steering apparatus according to claim 21, wherein each of said rack guide body and said pressing member is formed of a resin.

* * * * *